United States Patent [19]

Wetteborn

[11] 4,024,208

[45] May 17, 1977

[54] DEVICE FOR CARRYING OUT PHYSICAL AND/OR CHEMICAL REACTIONS BETWEEN LIQUIDS AND GASES

[75] Inventor: Wilhelm Wetteborn, Troisdorf, Germany

[73] Assignee: Klockner-Humboldt-Deutz Aktiengesellschaft, Cologne, Germany

[22] Filed: Mar. 28, 1975

[21] Appl. No.: 562,821

Related U.S. Application Data

[63] Continuation of Ser. No. 317,784, Dec. 22, 1972, abandoned.

[30] Foreign Application Priority Data

Dec. 22, 1971   Germany .......................... 2163745

[52] U.S. Cl. .............................. 261/112; 23/252 R; 23/283; 23/284; 23/285; 261/117; 423/210; 423/220

[51] Int. Cl.$^2$ ........................................ B01F 3/04

[58] Field of Search .......................... 261/108–111, 261/114 R, 117, 112, 78 A, 21, 22; 55/257, 440–444, 518; 423/210, 220, 659; 23/283, 284, 285, 252 R

[56] References Cited

UNITED STATES PATENTS

| | | | |
|---|---|---|---|
| 1,235,291 | 7/1917 | Clarke | 261/108 |
| 1,924,813 | 8/1933 | Sperr, Jr. | 261/22 X |
| 2,064,808 | 12/1936 | Beran | 261/21 X |
| 2,858,903 | 11/1958 | Goetz et al. | 261/22 X |
| 2,877,099 | 3/1959 | Bowles | 55/518 X |
| 2,890,870 | 6/1959 | Spiselman | 261/109 X |
| 2,915,302 | 12/1959 | Jacir | 261/110 X |
| 3,077,714 | 2/1963 | McIlvaine | 55/257 X |
| 3,456,709 | 7/1969 | Vegeby | 261/117 X |
| 3,797,810 | 3/1974 | Wolff | 261/112 X |
| 3,815,334 | 6/1974 | Kotting et al. | 261/111 X |
| 3,830,044 | 8/1974 | Wetteborn | 55/440 |

FOREIGN PATENTS OR APPLICATIONS

| | | | |
|---|---|---|---|
| 1,542,248 | 6/1970 | Germany | 55/257 |
| 1,157,466 | 7/1969 | United Kingdom | 55/440 |

*Primary Examiner*—Tim R. Miles
*Assistant Examiner*—Richard L. Chiesa
*Attorney, Agent, or Firm*—Herbert L. Lerner

[57] ABSTRACT

Method of carrying out physical or chemical reactions or both types of reactions between liquids and gases in a reaction channel provided with at least one device for feeding liquid thereto, the reaction channel having disposed therein at least one row of jalousie-like overlapping members having an impact surface and formed with a trough-shaped collecting space, the impact surface extending transversely to the direction of flow of a gas supplied to the reaction channel, includes the steps of supplying a flow of gas into the reaction channel, feeding a given quantity of liquid into the reaction channel so that it comes into contact and reacts with the gas, and removing through the trough-shaped collecting spaces a quantity of liquid ranging from no liquid to an amount thereof less than the given quantity of liquid fed into the reaction channel.

5 Claims, 3 Drawing Figures

DEVICE FOR CARRYING OUT PHYSICAL AND/OR CHEMICAL REACTIONS BETWEEN LIQUIDS AND GASES

This application is a continuation of application Ser. No. 317,784, filed Dec. 22, 1972, now abandoned.

The invention relates to a method of carrying out physical and/or chemical reactions between liquids and gases in a reaction channel which is provided with at least one liquid, feeding device and in which at least one row of jalousie or louver-like overlapping members have respective impact surfaces is disposed extending transversely to the flow direction of gas, the members being each provided with a trough-shaped collecting space.

From the German Published Non-prosecuted Patent Application No. 1,671,393, a device for separating solid, volatile and gaseous components from exhaust gases and quantities of exhaust air, has become known. The device disclosed therein includes a flow-through chamber wherein the gases are brought into contact with a liquid which is introduced into the flow chamber from several fan spray nozzles.

Such a device only partly fulfills the assigned task of carrying out physical and/or chemical reactions between liquids and gases, wherein both media must be brought into intimate contact with each other, because the liquid which emerges from the nozzles at high pressure and high speed is brought only briefly into contact with the gases. It might also be difficult to recirculate to the gases through the nozzles the liquid which has already been in contact with the gases, because the fine openings of these nozzles tend to clog, particularly when solids in dust form are additionally entrained by the gases. Moreover, because of the high pressure at which the liquid must be introduced through the nozzles, a great amount of energy must be expended which, besides the expensive fine-spray jets, directly affects the cost of the process.

It is accordingly an object of the invention to provide a method of carrying out reactions between liquids and gases in accordance with the invention, which are economical and have a high efficiency, while avoiding the foregoing shortcomings of the heretofore known method of this general type.

With the foregoing and other objects in view, there is provided, in accordance with the invention, method of carrying out physical or chemical reactions or both types of reactions between liquids and gases in a reaction channel provided with at least one device for feeding liquid thereto, the reaction channel having disposed therein at least one row of jalousie-like overlapping members having an impact surface and formed with a trough-shaped collecting space, the impact surface extending transversely to the direction of flow of a gas supplied to the reaction channel, which comprises the steps of supplying a flow of gas into the reaction channel, feeding a given quantity of liquid into the reaction channel so that it comes into contact and reacts with the gas, and removing through the trough-shaped collecting spaces a quantity of liquid ranging from no liquid to an amount thereof less than the given quantity of liquid fed into the reaction channel.

The advantage of this method is that the particles of the liquid are precipitated out of the gas flow at each impact surface during the passage thereof through the row of impact surfaces and subsequently collect in the troughs. Due to the acceleration of the gas flow at each impact surface, the liquid is again ejected from the troughs and, in the course of which, is very finely atomized. The dense fog of the liquid produced presents a large reaction surface to the onflowing gases, so that high absorption of, for example, gaseous chemical compounds in the liquid, or great depletion thereof in the gases is provided. A further advantage of this method is that the costly atomizer nozzles, through which the liquid was heretofore sprayed into the reaction channel under high pressure, can be dispensed with. Even large drops of liquid, which are introduced into the reaction channel by means of coarse liquid distributors, exhibit the desired, fog-like distribution of liquid particles behind each row of impact surfaces.

In accordance with another feature of the invention, wherein the respective members having an impact surface are formed of a flat portion having an elongated cross section and a trough-shaped portion defining the collecting space and located at one end of the elongated flat portion and to one side of an imaginary extension thereof, the method further comprises supplying the gas flow into the reaction channel in such a manner that it impinges on that side of the elongated flat portion of the member behind the imaginary extension of which the respective trough-shaped collecting space is located at the downstream end thereof in flow direction of the gas. Through this measure, the drops of liquid, which have advantageously been nonuniformly separated from the gas stream at each impact surface, are dammed up in the trough-like collecting space and are uniformly distributed over the length of the trough. Due to the advantageous atomizing effect, a fog of liquid uniformly distributed over the entire cross section of the reaction channel is formed.

In accordance with a further feature of the invention, the method includes introducing the liquid into the gas flow downstream of at least one row of the impact surfaces, as viewed in flow direction of the gas. Due to this feature of the method invention, the reaction liquid is displaced in the direction of the gas flow from one impact surface to another, intensive atomizing of the liquid and consequently a possible strong reaction with the gases being provided. The quantity of liquid fed into the reaction channel through the liquid-feeding device can become smaller, advantageously, from reaction stage to reaction stage, as seen in the direction of the gas flow, in order to attain uniform concentration in the liquid of, for example, gaseous chemical compounds of the gases. In a reaction which is carried out in the same flow direction, as opposed to counterflow the duration or dwell time of the liquid within the reaction channel is relatively short, so that this method is used particularly for reaction-aggressive media.

In accordance with an additional feature of the invention, wherein the reaction channel is a vertically disposed column, the method comprises introducing the gas flow into the column at the lower end thereof, and introducing the liquid in counterflow to the gas at a location above at least one row of the impact surfaces. The advantage of carrying out this reaction in counterflow is that the fog-like, atomized drops of liquid are temporarily suspended in the gas flow behind or downstream of each row of impact surfaces, whereby a particularly intensive contact, lasting for an extended period of time, is produced between the liquid fog and the gases. This method is particularly suited for media which require an adequately long time for a through reaction. The temporary suspension of the highly atomized liquid particles is facilitated particularly when a gas flow velocity is selected which is matched to the suspension velocity of the fog.

In accordance with an added feature of the invention, wherein the wall of the reaction channel is formed with an opening, the method includes withdrawing liquid from or feeding it to the gas flow with the trough-shaped collecting space and through the opening in the channel wall. In this manner, liquid can be removed advantageously from the gas flow at each row of impact surfaces, if a predetermined degree of concentration has already been reached and no further reaction with the gases is to take place. Furthermore, liquid can be introduced into the individual collecting spaces of a row of impact surfaces from the outside. This feature of the method of the invention is found to be of particular advantage when the collecting spaces of the impact surfaces have become clogged with solid particles entrained by the gas flow so that they can be rinsed or flushed free in a simple manner.

In accordance with yet another feature of the invention, the method includes reintroducing into the gas flow by at least one liquid-feeding device at least part of the liquid removed from the gas flow. In this regard, it is advisable that the quantity of recirculated liquid be controlled in dependence or contingent on the degree of its concentration. Through this measure or feature of the invention, the quantities of liquid which participate in the reaction process are advantageously returned continuously to the reaction channel until, for example, a gaseous chemical compound from the exhaust gases is present in a solution which can be industrially and economically utilized.

In accordance with a concomitant feature of the invention, the method includes reintroducing into the gas flow by at least one liquid-feeding device at least part of the liquid removed from the gas flow. In this connection, it is also advisable to control the quantity of the recirculated gases in dependence on the degree of purification of the gases. The advantage of this feature is that a required degree of purification of the gases is attainable therewith. In case the gas flow drops to a value at which the rows of impact surfaces no longer exhibit any atomizing action, the apparent throughput and accordingly the gas velocity can be advantageously increased in this manner until a very fine atomization of the liquid takes place again.

In accordance with another feature of the invention, with at least two of the reaction channels connected in series or tandem, the method includes introducing liquid into one of the reaction channels, in counterflow direction to the flow of gas therein, and into the next-following reaction channel in the same flow direction as that of the gas therein. This provides the possibility, in an advantageous manner, of carrying out the reaction between the liquids and the gases once in counterflow and another time in the same flow direction in the event the reactive aggressiveness between both media increases with decreasing temperature, so that for a reaction, the relatively short duration or dwell time of the liquids in the same-flow direction reaction channel is sufficient. The series or tandem connection of a counterflow reaction channel with a same-flow reaction channel furthermore offers the advantage that, through the direct connection of the channels one with the other, a compact construction is obtained.

In accordance with a further feature of the invention, with at least two of the reaction channels connected in series or tandem, the method includes reintroducing at least part of the liquid removed from the gas flow in one of the reaction channels into the gas flow in a succeeding reaction channel. An equalization or balancing of the degree of concentration of, for example, an aqueous solution of chemical compounds within the individual reaction channels is thereby advantageously facilitated.

Other features which are considered as characteristic for the invention are set forth in the appended claims.

Although the invention is illustrated and described herein as method of carrying out physical and/or chemical reactions between liquids and gases, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying drawing, in which.

Figure 1:
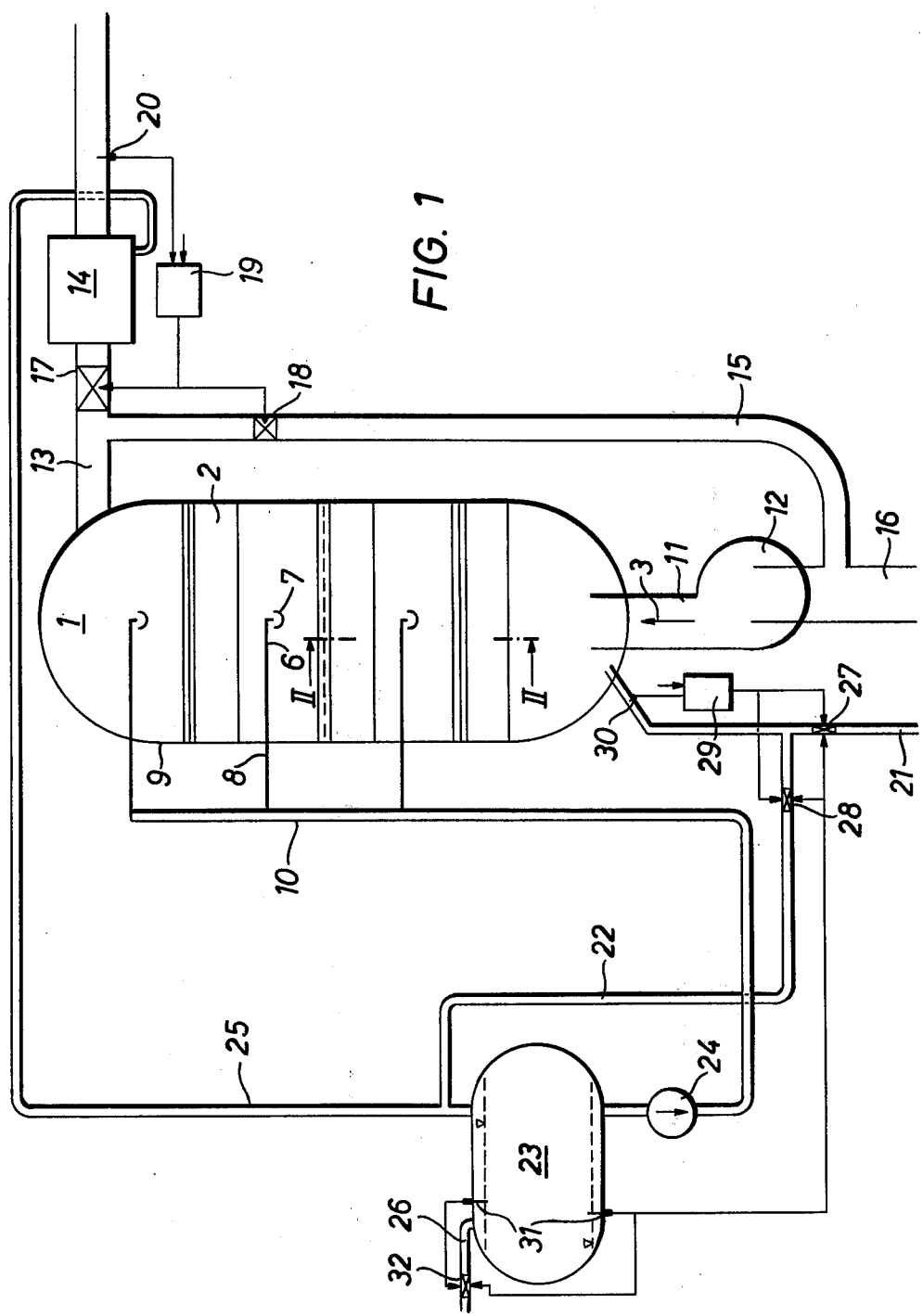
FIG. 1 is a schematic view of a system including a reaction channel or column for carrying out the method of the invention.
Figure 2:
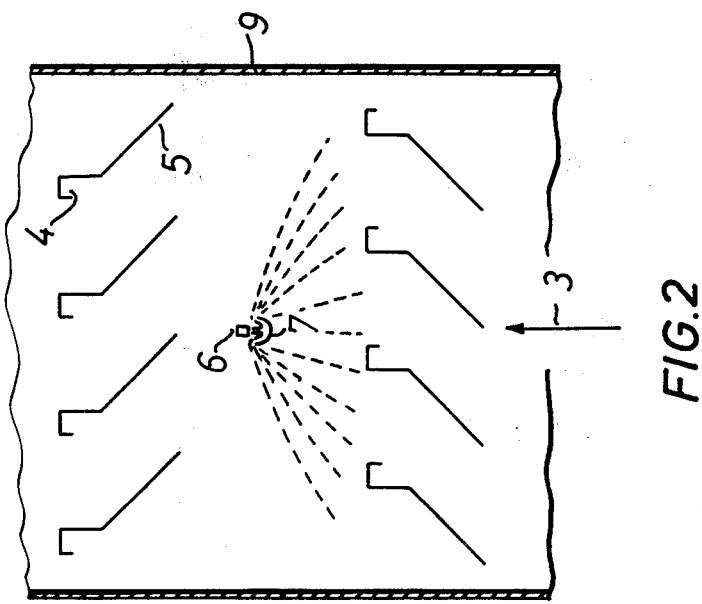
FIG. 2 is a cross-sectional view of FIG. 1 taken along the line II—II in the direction of the arrows and showing part of the reaction channel.

Referring now to the drawing and first, particularly to FIG. 1 thereof, there are shown therein, several rows of louver-like or jalousie-like overlapping baffle plates or members having impact surfaces 2 suitably mounted in a reaction channel or column 1 transversely to the flow direction and flow path 3 of a gas. As shown in FIG. 2, the impact surfaces are on a flat portion 5 of the baffle plate, and terminate in a collecting space 4, which is in the form of a trough and is situated behind an imaginary extension of the respective impact surface of the flat portion 5, on which the gas flow 3 impinges. Above each row of impact surfaces 2, there is located a liquid-feeding device 6, which, for example, is in the form of a simple pipe with an opening, and a concave deflector 7 disposed in front of it. A liquid supply line 8 respectively extends through the wall 9 of the reaction channel or column 1 and is connected to a common distribution line or manifold 10.

In the lower part the reaction channel or column 1, there is connected thereto a gas supply line 11 which opens coaxially into the reaction column 1 and is connected with a blower 12, which is in turn connected, for example, to an exhaust gas line 16 of a production system. At the upper part thereof, the reaction column 1 is connected to a gas discharge line 13, in which a liquid separator 14 of conventional type is connected. The gas discharge line 13 is connected, at a location upstream or ahead of the liquid separator 14, with the exhaust gas line 16 by a bypass line 15, the junction of the exhaust gas line 16 with the by-pass line 15 being upsteam or ahead of the blower 12. A control valve 17 is located in the gas discharge line 13 between the liquid separator 14 and the junction of the bypass line 15 with the discharge line 13. An additional control valve 18 is connected in the bypass 15. Both of the valves 17 and 18 are controlled by a conventional control 19 which cooperates with a conventional measuring sensor 20 that detects the degree of purity of the gas, and is connected in the gas discharge line 13 at a location thereof downstream or behind the liquid separator 14.

The liquid fed into the reaction column 1 is collected in the lower part of the column 1 and is withdrawn by a liquid discharge line 21. To this liquid discharge line 21, there is connected a bypass line 22 which is, in turn, connected to an equalization or expansion tank 23. The expansion tank is further connected to the distribution line or liquid supply manifold 10 through a liquid pump 24. The expansion or equalization tank 23 and the liquid separator 14 are connected one to the other by a connecting line 25. A liquid line 26 is furthermore connected to the equalization tank 23.

In the liquid discharge line 21 and in the bypass line 22, there are connected control valves 27 and 28, respectively. Both control valves are connected to a control 29 which cooperates with a measuring sensor 30 that detects the degree of concentration of a gaseous chemical compound, for example, in the liquid. The measuring sensor 30 is located in the liquid discharge line 21, a short distance below the point of connection thereof with the lower part of the reaction column 1. The two control valves 27 and 28 cooperate with a liquid level monitor 31 which is located in the lower part of the equalization or expansion tank 23 and further cooperates with a control valve 32, which is located in the liquid line 26 at a location ahead or upstream of the equilibrium or expansion tank 23.

The method of the invention is described hereinafter with reference to the manner in which the aforedescribed device operated, further features of the invention being described in the course thereof.

A predetermined quantity of gas is continuously blown into the lower part of the reaction column or channel 1 through the gas supply line 11 by means of the fan or blower 12. The gas initially flows through the row of impact surfaces 2 which are located directly opposite the gas inlet opening from the line 3 into the channel 1, a greatly accelerated gas flow being produced within the row of impact surfaces 2 due to the pressure reaction or conversion at the surfaces 2.

Above the row of impact surfaces 2, liquid is introduced into the reaction column 1 in a flow direction opposite that of the gases by means of a liquid-feeding device, which includes a pipe 6 formed with an opening and a deflector 7. Part of the relatively large drops of liquid reach the vicinity of the row of impact surfaces 2 under the action of gravity and deposit on the impact surface 2 of the flat portion 5, of each of the baffle plates from which they are forced by the gas below 3 into the respective collecting spaces 4 for each impact surface 2. Due to the relatively high velocity of the gas, liquid is entrained therein from the trough-like collecting spaces and is finely atomized. It is advantageous for the liquid to be introduced into the gas flow from the free edge of the open side of the trough 4 either perpendicularly or at an acute angle, considered in flow direction 3 of the gas. The liquid fog that is consequently produced has great absorption capacity due to its large surface. The individual liquid particles, which have absorbed gaseous chemical compounds, for example, from the gas flow, are carried along by the gas flow to the next row of impact surfaces 2, at which the liquid particles are precipitated from the gas flow and are subsequently guided along the flat portion 5 of the baffle plate into the respective collecting spaces 4. Liquid is again pulled out of the collecting spaces 4 due to the high gas velocity prevailing there, and is finely atomized. This process is repeated within the reaction channel or column 1 from row to row of the impact surfaces 2, so that a strong reaction between the gas and the liquid becomes possible.

After passing through the last row of impact surfaces 2, the gas flowing from the reaction column 1 through the gas discharge line 13 simultaneously carries out therewith finely atomized liquid particles. These liquid particles are then departed from the gas in a liquid separator 14 of any desired construction disposed in the gas discharge line 13.

The liquid accumulated or dammed up in the collecting spaces 4 of each row of impact surfaces 2, to the extent that it is not ejected again from the collecting spaces 4 by the gas flow and is atomized, flows downwardly along the wall 9 of the housing into the lower part of the reaction column 1, from which it is withdrawn through a liquid discharge line 21.

In accordance with the method of the invention, at least part of the quantity of the liquid withdrawn from the reaction column 1 is re-introduced into the reaction column and, therefore, into the gas flow by the liquid-feeding device 6, 7. The quantity of the recirculated liquid is controlled in dependence on its degree of concentration. The quantities of liquid withdrawn from the reaction column 1 and the liquid separator 14 are collected in an equalization or expansion tank 23, from which they are returned to the reaction column 1 through a pump 24. If the degree of concentration of the liquid which is measured by the sensor 30 and is applied as reference value at the control 29, is obtained, the control valve 28 located in the bypass 22 is closed and at the same time, the control valve 27 which is located in the liquid discharge line 21 is opened until so much liquid is drawn from the reaction column 1, and from the equalization or expansion tank 23 that the lower level monitor 31 disposed in the equalization or expansion tank 23 is responsive. Thereupon, the control valve 27 located in the liquid disharge line 21 is closed again, the control valve 28 connected in the bypass 22 is opened and, simultaneously, the control valve 32 located in the liquid line 26 is opened, so that fresh reaction liquid can flow into the equalization or expansion tank 23 until the upper level monitor 31 responds and the valve 32 closes again. In this manner, a defined quantity of liquid can be recirculated until a required degree of concentration is attained.

On the gas side, at least part of the quantity of gas flowing out of the reaction column 1 is re-introduced into the reaction column 1 through the bypass line 15, the quantity of the recirculated gases being controlled in dependence upon or subject to the degree of purification thereof. If, for example, a desired degree of purification measured by the sensor 20 and signalled to the control 19 is attained, the control valve 17 located in the gas discharge line 13 ahead or upstream of the liquid separator 14 is increasingly opened so that the gas throughput through the separator 14 is increased and, simultaneously, the control valve 18 located in the bypass line 15 is closed further. If the required degree of purification of the gases detected by the sensor 20 is insufficient, the control valve 17 is closed again and the control valve 18 located in the bypass 15 is opened, so that the pre-purified gas from the discharge line 13 is added in larger quantities to the unpurified quantities of exhaust gas from the line 16 to the reaction column 1. In this manner, variations in the degree of impurity of the exhaust gases can be compensated for.

Figure 3:
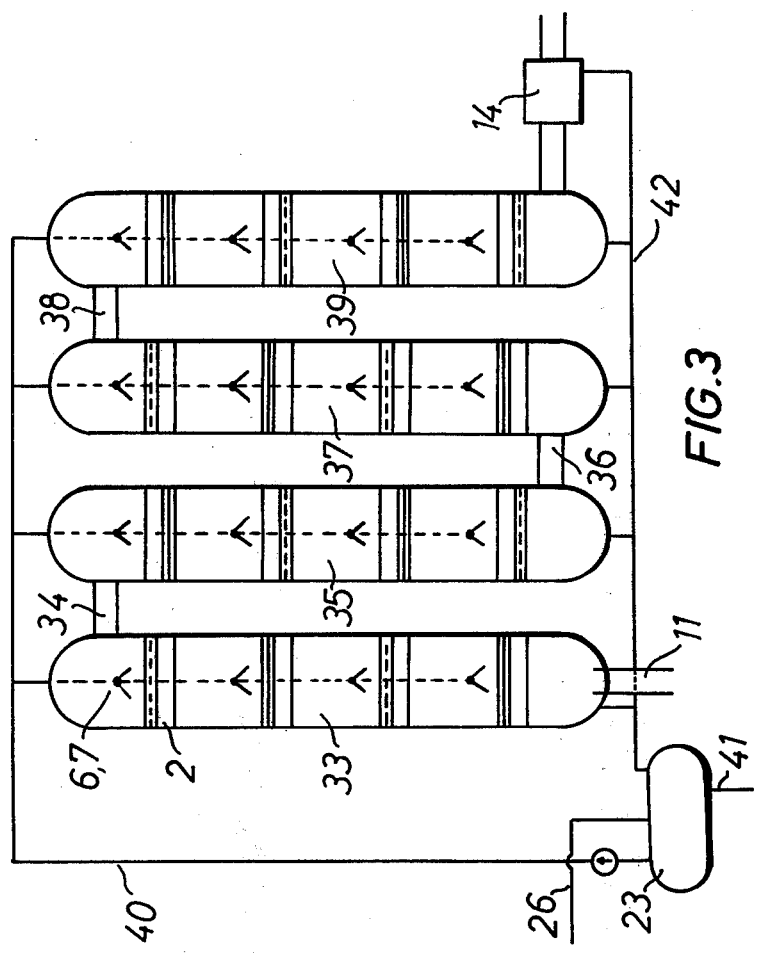
FIG. 3 is a schematic diagram of another embodiment of the system of FIG. 1 which includes several serially connected reaction channels.

In FIG. 3, an assembly of four reaction columns or channels 33, 35, 37 and 39 arranged in series or tandem in accordance with the invention is shown, each of which having several rows of baffle plates with impact surfaces 2 and several liquid-feeding devices 6, 7. The first reaction column 33 is connected at the lower end thereof to the gas supply line 11 and is connected at the upper end thereof to a gas discharge pipe 34, which simultaneously serves as the gas inlet pipe for the second reaction column 35. The second reaction column 35 is provided at its lower end with a gas discharge pipe 36, which serves simultaneously as the gas inlet pipe for the third reaction column 37, which, in turn, is provided at its upper end with a gas discharge pipe 38 also serving simultaneously as a gas input pipe for the fourth reaction column 39. The fourth reaction column 39 is connected at its lower end to a gas discharge line 13 which, in turn, is connected to a liquid separator 14 of conventional type. In this illustrated embodiment of FIG. 3, the gas is conducted, according to the invention, in an updraft in the first and third reaction columns 33 and 37, the liquid being introduced into the columns 33 and 37 in a direction opposite to the flow direction of the gases. In the second and fourth reaction columns 35 and 39, the gas is conducted in a downdraft, the liquid being introduced into the columns 35 and 39 in the same direction as that of the gas flow therein. The liquid is supplied to all four reaction columns 33, 35, 37 and 39 from a common distribution line or supply manifold 40, which is connected to a liquid equalization tank 23, to which there are connected, in turn, a liquid line 26, a discharge line 41 and a collecting line 42.

The method, as aforementioned, is not limited to the described construction of one or more serially or in tandem connected reaction channels or columns which are aligned vertically as well as, possibly, horizontally, or in between, but two or more reaction columns can also be assembled side-by-side in the form of a parallel circuit, the gas being fed from a common gas inlet line to the individual reaction columns in an updraft or a downdraft, respectively.

I claim:

1. Device for carrying out physical or chemical reactions or both types of reactions between liquids and gases comprising a vertically disposed reaction channel provided with at least one device for feeding liquid thereto, said reaction channel having disposed therein at least one row of jalousie-like overlapping members, each member having an impact surface terminating in a trough-shaped collecting space, said trough-shaped collecting spaces being horizontally disposed in said vertical reaction channel, a gas supply inlet for introducing gas flow in an upward direction into said reaction channel disposed at the lower end thereof, a liquid feed inlet for introducing the liquid in the reaction channel in counterflow direction to the gas flow disposed at a location above at least one row of the members which have an impact surface, said impact surfaces extending transversely to the direction of flow of said gas supplied to the reaction channel, the open side of said trough-shaped collecting space facing the flow of gas and located downstream to the gas flow of an imaginary upward extension of the impact surface with the impact surface upstream from the imaginary extension, said liquid feed inlet feeding the liquid so that the gas flow contacts the liquid at said impact surface and travels therewith along said impact surface upstream of said trough-shaped collecting space and collects therewith in said trough-shaped collecting space wherein intimate reaction occurs and a liquid fog is formed, means for withdrawing liquid from the reaction channel and control means for adjusting said liquid feeding device to introduce into said reaction channel a volume of liquid greater than the volume of liquid flowing out via said trough-shaped collecting spaces, and an outlet in said reaction channel disposed at the upper end thereof for discharge of gas carrying out therewith liquid particles from said reaction channel.

2. Device according to claim 1 wherein the reaction channel has an outlet for the gas flow, and which includes means for reintroducing at least part of the gas flowing out of the reaction channel into a circulatory loop of the flow of gas supplied into the channel and means for controlling the quantity of the gas conducted in the circulatory loop in dependence on the degree of purification of the gas.

3. Device according to claim 1 wherein at least two of the reaction channels are connected in series, and which includes means for introducing liquid into one of the reaction channels, in counterflow direction to the flow of gas therein, and into the next-following reaction channel, in the same flow direction as that of the gas therein.

4. Device according to claim 1 wherein at least two of the reaction channels are connected in series and which includes means for reintroducing at least part of the liquid removed from the gas glow in one of the reaction channels into the gas flow in a succeeding reaction channel.

5. Device according to claim 1 which includes means for reintroducing into the gas flow by means of at least one liquid-feeding device at least part of the liquid removed from the reaction channel and means for controlling the quantity of reintroduced liquid in dependence upon the degree of concentration thereof.

* * * * *